United States Patent
Hatano et al.

(10) Patent No.: US 6,856,433 B2
(45) Date of Patent: Feb. 15, 2005

(54) HOLOGRAPHIC RECORDING MEDIUM AND HOLOGRAPHIC RECORDING/ REPRODUCING APPARATUS USING THE SAME

(75) Inventors: Hideki Hatano, Tsurugashima (JP); Takashi Yamaji, Tsurugashima (JP); Kenji Kitamura, Tsukuba (JP); Shunji Takekawa, Tsukuba (JP); Masaru Nakamura, Tsukuba (JP)

(73) Assignees: Pioneer Corporation, Tokyo (JP); National Institute for Material Science, Ibaraki (JP)

( * ) Notice: Subject to any disclaimer, the term of this patent is extended or adjusted under 35 U.S.C. 154(b) by 0 days.

(21) Appl. No.: 10/656,879

(22) Filed: Sep. 8, 2003

(65) Prior Publication Data

US 2004/0120020 A1 Jun. 24, 2004

(30) Foreign Application Priority Data

Sep. 10, 2002 (JP) .................................... 2002-263809
Sep. 4, 2003 (JP) .................................... 2003-312287

(51) Int. Cl.⁷ ............................................. G03H 1/02
(52) U.S. Cl. .................................. 359/7; 359/3; 430/1
(58) Field of Search .......................... 359/3, 7; 430/1, 430/2; 365/125, 216

(56) References Cited

U.S. PATENT DOCUMENTS 3,933,504 A * 1/1976 Phillips et al. ................. 430/2

6,373,806 B1 * 4/2002 Kitamura et al. .......... 369/103

OTHER PUBLICATIONS

L.Galambos et al., "Doubly doped stoichiometric annd congruent lithium niobate for holographic data storage", Journal Crystal Growth, 229, pp. 228–232(2001).*

Journal of Crystal Growth 229 (2001) 228–232 Doubly doped stoichiometric and congruent lithium niobate for holographic data storage.

Photorefractive Materials for Nonvolatile vol. Holographic Data Storage, Science Volume 282, Nov. 6, 1998 Lambertus Hesselink, et al.

Intensity dependence and white–light gating of two–color photorefractive gratings in LiNbO₃, Sep. 1, 1997/vol. 22, No. 17/ Optics Letters, H. Guenther, et al.

* cited by examiner

Primary Examiner—Leo Boutsikaris
(74) Attorney, Agent, or Firm—Sughrue Mion, PLLC

(57) ABSTRACT

A holographic recording medium exhibiting a high recording sensitivity without execution of reduction treatment. A system records information on the holographic recording medium by using a gating light within a wavelength band causing less optical damage to the holographic recording medium. The holographic recording medium includes a single crystal of lithium niobate (LiNbO₃) or lithium tantalate (LiTaO₃) containing Mn as a dopant.

8 Claims, 9 Drawing Sheets

HOLOGRAPHIC RECORDING MEDIUM AND HOLOGRAPHIC RECORDING/REPRODUCING APPARATUS USING THE SAME

BACKGROUND OF THE INVENTION

1. Field of the Invention

The present invention relates to a holographic recording medium, and a holographic recording/reproducing apparatus using the same. More particularly, the invention relates to a two-color holographic recording medium which not only realizes high recording sensitivity without reducing treatment but also can reduce optical damage produced by the irradiation of gating light, and a two-color holographic recording/reproducing system using the same.

2. Description of the Related Art

Recently, accompanying to the increase in information capacity to be recorded in information recording medium, the requirement for the recording medium provided with potential of huge capacity and rapid readout (fast data transfer) is accelerating. One of the candidates for such a medium is a holographic memory medium using ferroelectric crystal of, for example, lithium niobate ($LiNbO_3$), a lithium tantalate ($LiTaO_3$), or the like.

Conventionally, a holographic memory system is an optical data storage system in which information is three-dimensionally recorded by use of laser, in a manner of volumetric multiplexing based on principles of volume holography. The photorefractive effect utilized in the medium is a phenomenon in which electric charges generated by photoexcitation caused by irradiation with light move within the crystal to form a space charge distribution, and the space charge distribution changes the refractive indices of the crystal via a linear electro-optical effect, i.e. the Pockels effect in a manner corresponding to the space charge distribution.

There are two recording methods employed by the above holographic memory: one-color holography and two-color holography. The one-color holography suffers from a problem, or what is called "reproduction deterioration" that reproduction light progressively erases a recorded hologram when the reproduction light reads out signals from the hologram. Two-color holography is a recording method, which solves the issue of the erasure during readout in one-color holography.

Figure 9:
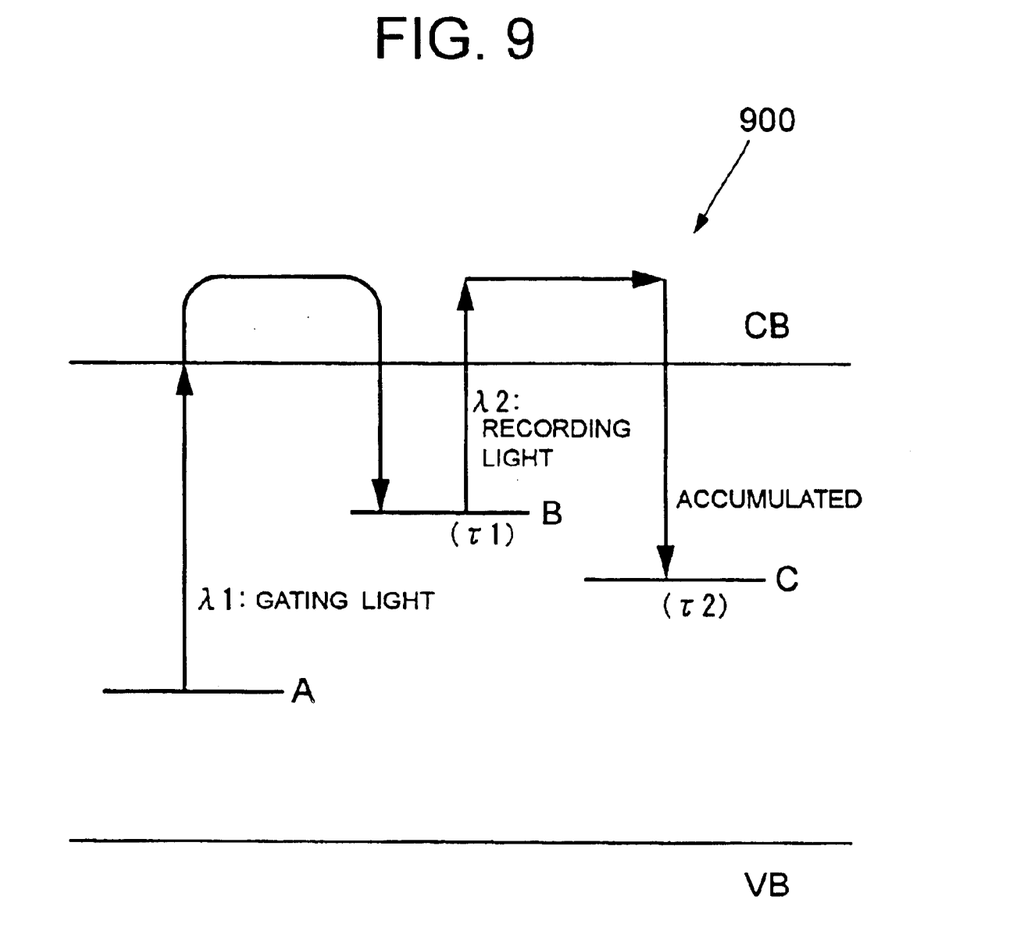
FIG. 9 is a schematic diagram showing a recording mechanism in a two-color holographic recording.

FIG. 9 illustrates the recording mechanism of two-color holography. Energy band structure 900 of the holographic recording medium which adopts two-color holography consists of the valence band (VB), the conduction band (CB), and three energy levels, i.e. a level A, a level B, a level C between the valence band (VB) and the conduction band (CB). The energy level A (light absorption center or bipolaron) exists at the deeper energy position than the energy level B (metastable intermediate level or small polaron) when measured from the bottom of the conduction band. The energy level C (trap level or storage center) exists at the deeper energy position than the energy level B. Next, the mechanism of recording information into the holographic medium using two-color holography is explained.

Holographic recording medium is irradiated with a gating light (at a wavelength $\lambda_1$) to create carriers responsible for photorefractive effect. In the portion irradiated with the gating light, the carriers are excited from the level A to the conduction band (CB), and temporarily trapped at the intermediate level B. A carrier lifetime at the level B is $\tau_1$.

The medium is irradiated with recording lights in order to record information. Recording light consists of a reference light (at a wavelength $\lambda_2$) and a signal light carrying information to be recorded (at a wavelength $\lambda_2$). Wavelength $\lambda_1$ and wavelength $\lambda_2$ have to obey the relationship of $\lambda_1 < \lambda_2$. The carriers at the intermediate level B are excited into the conduction band (CB) by irradiating recording light according to the spatial intensity profile of interference fringes formed by a reference light and a signal light, and finally accumulated at the trap level (storage center)C in the form of a concentration distribution of the carriers corresponding to the interference fringes, to complete the recording operation. A carrier lifetime at the level C is $\tau_2$.

As specific means for two-color holography using lithium niobate, there has been proposed a method using single-crystal lithium niobate (LN) subjected to reduction treatment. One example of this material is a crystal of reduced lithium niobate doped with praseodymium (Pr) (H. Guenther, G. Wittmann, and R. M. Macfarlene (IBM), R. R. Neurgaonkar (Rockwell); "Intensity dependence and white-light gating of two-color photorefractive gratings in $LiNbO_3$", Opt. Lett. vol. 22, pp. 1305–1307 (1997)). Another example is reduced lithium niobate crystal undoped or doped with Fe or Mn (L. Hesselink, S. S. Orlov, A. Liu, A. Akella, D. Lande, and R R. Neurgaonkar: "photorefractive Materials for Nonvolatile Volume Holographic Data Storage", Science Vol. 282 (November 6), pp. 1089–1094 (1998)).

However the two-color holographic recording materials mentioned above are required to be subjected to reduction treatment in order to obtain enough sensitivity for the use in holographic recording medium. More specifically, the materials can be hardly used as recording materials in an as-grown state or in a state subjected to heat treatment in the air since they have a low recording sensitivity in such a state (for example, sensitivity is in the order of $10^{-4}$ cm/J or lower). Reduction is inevitable process to establish energy level A occupied by enough electrons in the materials.

Further, if reduction treatment is excessively carried out, the dark conductivity of the crystal is increased to shorten storage time, causing a problem in the practical use thereof. Further, it is difficult to control the two-color holographic memory system since the holographic properties (sensitivity etc.) of the materials are largely varied depending on the degree or condition of the reduction treatment (such as temperature, atmosphere, time etc.).

For example, in the two-color holographic recording materials disclosed in the latter reference mentioned above, a gating light at a wavelength from 458 nm to 488 nm is used. When the gating light at the relatively longer wavelength is employed, some kind of light scattering (optical damage) called beam fanning is liable to be caused by the photorefractive effect. When beam fanning occurs, an image reproduced from information written in the holographic memory is deformed, and data is degraded, so that the quality of the hologram is largely reduced.

Besides, in the two-color holographic recording material disclosed in the latter reference mentioned above, optimization of Mn content has not been established.

Consequently, the object of this invention is to provide a holographic recording medium in which a high recording sensitivity can be obtained without reduction treatment and optical damage under the irradiation is reduced, and to provide a holographic recording/reproducing system using the same.

In addition, it is to be noticed that the term "optical damage" used herein is optical scattering caused by the exposure of gating light and does not mean photorefractive effect for creating the hologram for the information storage.

SUMMARY OF THE INVENTION

According to a first aspect of the present invention, a holographic recording medium comprises a crystal body including a lithium niobate single crystal or a lithium tantalate single crystal which has substantially stoichiometric composition and includes Mn as an impurity in the range from 1 wt ppm to 100 wt ppm.

The crystal body includes a first energy level, a second energy level, and a third energy level, wherein said first energy level exists at the deeper energy position than said second energy level measured from the bottom of a conduction band, wherein said third energy level exists at the deeper energy position than said second energy level measured from the bottom of the conduction band, wherein carriers are excited from said first energy level to said second energy level by the irradiation of a gating light at a wavelength of 410 nm or shorter, and wherein said carriers excited to said second energy level are trapped to said third energy level by the irradiation of a signal light and a reference light at a wavelength longer than said gating light.

A product $\alpha_g \cdot L$ of an optical absorption coefficient ($\alpha_g$) of said lithium niobate single crystal or lithium tantalate single crystal with respect to said gating light and a length (L) of said single crystal along said gating light incident direction is within a range of 0.5 to 2.0.

According to a second aspect of the present invention, a holographic recording/reproducing apparatus for recording information in a holographic recording medium and for reproducing information from said holographic recording medium comprises a first irradiation means for irradiating said holographic recording medium with a gating light having a wavelength of 410 nm or shorter, a second irradiation means for irradiating said holographic recording medium with a signal light containing information to be recorded and a reference light, wherein said gating light has a shorter wavelength than those of said signal light and said reference light, wherein said holographic recording medium comprises a crystal body including a lithium niobate single crystal or a lithium tantalate single crystal which has substantially stoichiometric composition and includes Mn as an impurity in the range from 1 wt ppm to 100 wt ppm.

A holographic recording medium according to the present invention comprises a crystal body including a lithium niobate single crystal or a lithium tantalate single crystal which has "substantially" stoichiometric composition and includes Mn as an impurity in the range from 1 wt ppm to 100 wt ppm. The crystal body has a first energy level, a second energy level, and a third energy level between the conduction band and valence band, wherein the first energy level exists at the deeper energy position than the second energy level and the third energy level exists at the deeper energy position than the second energy level when measured from the bottom of the conduction band. Carriers are excited from the first energy level to the second energy level by the irradiation of a first light at a wavelength of 410 nm or shorter.

The lithium niobate single crystal or lithium tantalate single crystal mentioned above possesses the first energy level and electrons exists in the energy level at as-grown condition. This means that enough carriers at the first energy level can be available even reduction treatment is not performed. Accordingly high sensitivity can be obtained without troublesome reduction treatment by using the holographic recording medium according to the present invention.

Moreover, because of the reason that the wavelength of the first light which is responsible for the generation of the carriers to be used in photorefractive process is equal to or shorter than 410 nm, optical damage is reduced compared to the conventional holographic recording medium.

DETAILED DESCRIPTION OF THE INVENTION

The present invention will now be described in detail with reference to the drawings showing an embodiment thereof.

The recording and reproducing mechanism in a holographic recording medium according to the present invention is described. The medium comprises substantially stoichiometric lithium niobate single crystal doped with Mn in the range from 1 wt ppm to 100 wt ppm. This crystal is hereafter referred to simply as Mn-SLN.

Figure 1:
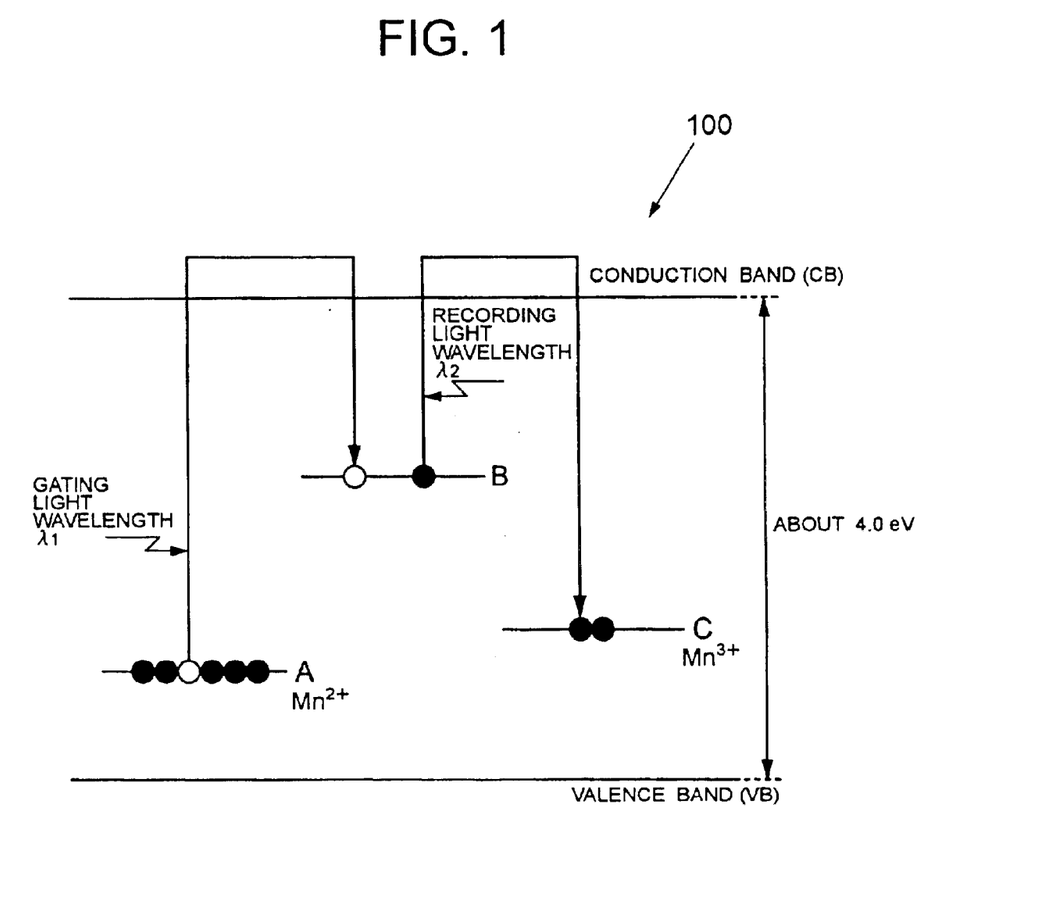
FIG. 1 is a schematic diagram showing an energy band structure of a holographic recording medium comprising Mn-SLN.

FIG. 1 shows schematically an energy band structure 100 of a holographic recording medium comprising Mn-SLN according to the present invention.

The energy band structure 100 has a first energy level A, a second energy level B and a third energy level C between the conduction band (CB) and valence band (VB). The bandgap (energy difference between the bottom of the conduction band and the top of the valence band) of Mn-SLN is about 4.0 eV.

The first energy level A is a donor level responsible to $Mn^{2+}$ created by the doping of Mn into the crystal. If the carriers existing at the energy level A are excited by optical excitation, they can be responsible for photorefractive effect. The second energy level B is an intermediate level at which the carriers optically excited from the energy level A are temporarily trapped. The third energy level C is an accepter level responsible to $Mn^{3+}$ created by the doping of Mn into the crystal. The energy depth of the first energy level A is deeper than the second energy level B. The energy depth of the third energy level C is deeper than the second energy level B. The relationship between the depth of the first energy level A and the third energy level C is insignificant.

In Mn-SLN, the first energy level is established and electrons exist in the first energy level A at as-grown condition. Therefore, Mn-SLN does not require any reduction treatment.

The charge transfer mechanism in recording hologram into the holographic recording medium comprising Mn-SLN is described step by step.

S100: The holographic recording medium is irradiated with a gating light (the first light) for the carriers existing at the first energy level to be excited. The wavelength $\lambda_1$ of the gating light is equal to or shorter than 410 nm. The carriers existing at the first energy level A are excited to the conduction band (CB) by gating light.

S101: During drifting in the conduction band, the excited carriers are temporarily trapped at the second energy level B. The carriers responsible to photorefractive effect are formed at the second energy level B.

S102: The holographic recording medium is irradiated with recording light (the second light) in order to record information. Recording light consists of a reference light (at a wavelength $\lambda_2$) and a signal light carrying information to be recorded (at a wavelength $\lambda_2$). Wavelength $\lambda_1$ and wavelength $\lambda_2$ have to obey the relationship of $\lambda_1 < \lambda_2$. The carriers at the intermediate level B are excited into the conduction band (CB) by recording light according to the spatial intensity profile of interference fringes formed by a reference light and a signal light. The irradiation of recording light should be performed during the lifetime of the carriers at the energy level B. Incidentally, as for the wavelength of the recording light, 778 nm is used. However it goes without saying that the wavelength of the recording light is not limited to this value.

S103: The carriers excited to the conduction band are finally accumulated at the energy level C in the form of a concentration distribution of the carriers corresponding to the interference fringes to complete the recording operation.

According to the present invention, the carriers responsible for photorefractive effect can be created by using the light at a wavelength of 410 nm or shorter, optical damage at an irradiation of gating light is reduced. As a light source for gating, such a compact laser source as a GaN semiconductor laser, a third harmonic generation of YAG laser etc. can be used In the present invention, making the size of the optical system compact.

When the information is reproduced from the holographic recording medium, only the reference light is incident on the medium. Since the irradiation of the reference light (wavelength $\lambda_2$) cannot excite the carriers trapped at the energy level C, a non-volatile readout is achieved.

A holographic recording medium according to the present invention comprises a single crystal of substantially stoichiometric lithium niobate doped with Mn in the range from 1 wt ppm to 100 wt ppm. Such an Mn-SLN single crystal may be grown by a double-crucible growth method. The melt used for the crystal growth was prepared by adding Mn with a content between 1 wt ppm to 100 wt ppm to a melt having a composition with molar fraction of $[Li_2O]/([Li_2O]+[Nb_2O_5])=0.56$ to 0.60. The Mn-STN grown by the melt has a molar fraction of $[Li_2O]/([Li_2O]+[Nb_2O_6])$ of 0.495 to 0.50, and excellent optical homogeneity.

The results of various optical experiments executed using the samples of present invention are explained. Two different contents of Mn are selected from a range of 1 wt ppm to 100 wt ppm. The samples were substantially stoichiometric lithium niobate doped with 8 ppm and 50 ppm Mn (abbreviated to MnS-SLN, Mn50-SLN, respectively), and substantially stoichiometric non-doped lithium niobate (Nondoped SLN) as reference. Grown crystals are each formed into a plate with a thickness of 2 mm.

The term "substantially stoichiometric compositiion" is defined like this: although molar fraction of $[Li_2O]/([Li_2O]+[Nb_2O_5])$ is not 0.50, composition is very close to the stoichiometric composition compared to the congruent composition, namely molar fraction of $[Li_2O]/([Li_2O]+[Nb_2O_5])$ is in the range from 0.495 to 0.50.

Figure 2:
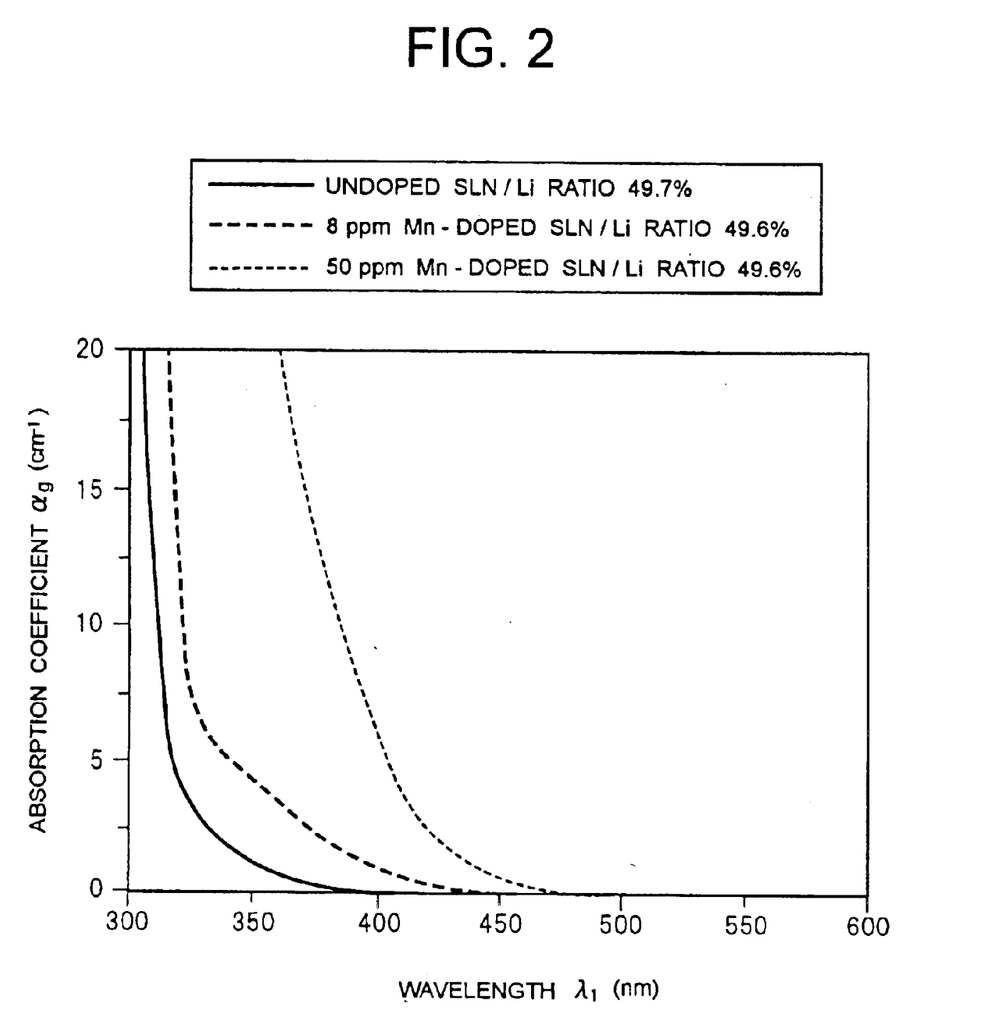
FIG. 2 is a graph of gating wavelength ($\lambda_1$) dependence of absorption coefficient ($\alpha_g$) at gating wavelength.

FIG. 2 shows the wavelength ($\lambda_1$) dependence of absorption coefficient ($\alpha_g$, in cm$^{-1}$) at gating wavelength. The horizontal axis is corresponding to the wavelength ($\lambda_1$, in nm) of a gating light. The vertical axis is corresponding to the absorption coefficient $\alpha_g$ (in cm$^{-1}$).

The crystals of Nondoped SLN, Mn8-SLN and Mn50-SLN were irradiated with gating light having a wavelength in a range of 300 nm to 600 nm, and the wavelength dependence of absorption coefficient ($\alpha_g$) was measured. In the figure, solid line is a result for Nondoped SLN, broken line is the result for Mn8-SLN, and the dotted line is the result for Mn50-SLN. Gate absorption coefficient ($\alpha_g$) for Mn8-SLN and Mn50-SLN increased at 410 nm. As the wavelength of the gating light became shorter than 410 nm, the gate absorption coefficient ($\alpha_g$) for Mn8-SLN and Mn50-SLN increased. On the other hand, in non-doped SLN, gate absorption coefficient ($\alpha_g$) was very small even at 350 nm, insufficient for the gating in two-color holography.

In two-color recording system, the following formula (1) and (2) express a relationship between gate absorption coefficient ($\alpha_g$) and recording sensitivity S of hologram recording medium.

$$S \propto \Delta\alpha_{IR} \propto n_B \quad (1)$$

$$n_B = K \cdot \alpha_g \cdot e^{-\alpha_g x} \quad (2)$$

Here, $\Delta\alpha_{IR}$ is optically-induced absorption, namely, the optical absorption change induced at recording wavelength ($\lambda_2$) by the irradiation of gating light. $n_B$ is density of carrier excited from the first energy level A and transferred to the second energy level B. K is a arbitrary constant. x is the depth from the surface of the medium along the direction of incidence of gating light. According to the formula (1), the recording sensitivity S is proportional to optically induced absorption and carrier density at the energy level B. From the formula (2), carrier density $n_B$ at given depth (namely x is fixed) in a holographic recording medium is closely related to the gate absorption coefficient $\alpha_g$. In other words, in order to increase the recording sensitivity in two-color holographic recording medium, the gate absorption coefficient $\alpha_g$ should be optimized.

According to the present invention, as illustrated in FIG. 2, by using a gating light at a wavelength below 410 nm, a holographic recording medium of Mn-SLN with higher recording sensitivity is therefore provided. Also, in the holographic recording medium comprising Mn-SLN according to the invention the first energy level A is established and electrons exist in the first energy level A even at as-grown condition (FIG. 1), higher $n_B$ exceeding a conventional medium can be obtained without troublesome reduction treatment. In other words, the holographic recording medium comprising Mn-SLN according to the invention can achieve higher recording sensitivity without reduction treatment.

Referring to FIG. 2, the gate absorption coefficient $\alpha_g$ for the gating light with the same wavelength is largely depending on Mn content. Namely, the gate absorption coefficients $\alpha_g$ for the gating light with the same wavelength increased according to the increase in Mn content. This suggests that for the gating light with a given wavelength, the gate absorption coefficient $\alpha_g$ can be controlled to the optimum value by controlling the Mn content.

Although FIG. 2 shows the relationship of 8 wt ppm and 50 wt ppm Mn-doping, simiiar result is obtained provided the Mn content is in the range from 1 wt ppm to 100 wt ppm.

The carrier lifetime $\tau_B$ at the second energy level (intermediate level or small polaron level) B (FIG. 1) was measured.

Table 1 shows the comparison of the carrier lifetime at the second energy level B.

TABLE 1

| Sample | Mn8-SLN | Mn50-SLN | Fe10-SLN | Fe25-SLN |
|---|---|---|---|---|
| Life time $\tau_B$(sec) | 0.3 | 0.2 | 0.2 | <0.01 |

Fe10-SLN is a substantially stoichiometric lithium niobate doped with 10 ppm Fe. Fe25-SLN is a substantially stoichiometric lithium niobate doped with 25 ppm Fe. Referring to Table 1, dependence of the carrier lifetime $\tau_B$ on the doping concentration is very small in Mn-doping compared to Fe-doping. This suggests that controlling of recording sensitivity is easily attainable in Mn-doping because the carrier lifetime $\tau_B$ at the second energy level B does not change much with Mn content. Moreover the carrier lifetime $\tau_B$ exist in the range of several-tenths second, relatively small power laser with continuous oscillation can be used for the recording light source.

As to the above holographic recording medium according to the present invention, measurement was performed on the fanning (optical damage) caused by an irradiation of gating light.

Figure 3:
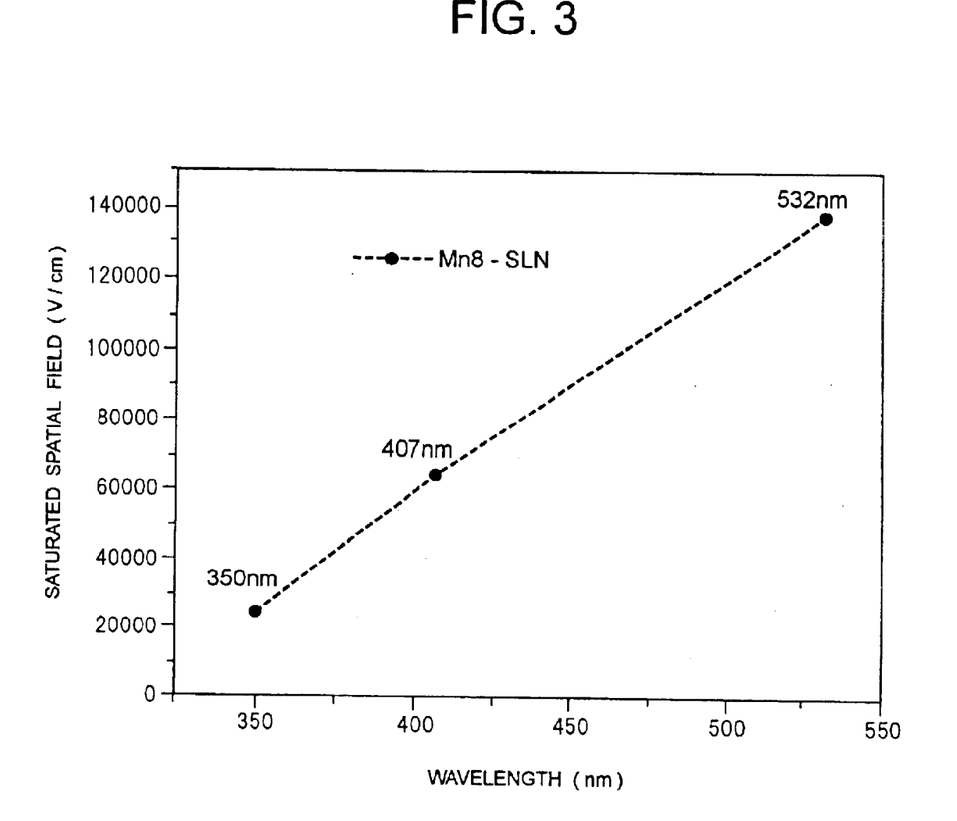
FIG. 3 is a graph showing gate wavelength dependency of a saturated spatial field.

FIG. 3 shows the gate wavelength dependence of a saturated spatial (electric) field. The horizontal axis is a gate wavelength (in, nm) and the vertical axis is a saturated spatial electric field (in V/cm). A saturated spatial electric field is an electric field produced inside the crystal by irradiation of light (gating light). If the saturated spatial electric field is high and exceeds a threshold value, fanning (optical damage) occurs.

FIG. 3 shows the change of the saturated spatial electric field against the irradiation of gating light at a wavelength between 350 nm and 532 nm in the holographic recording medium consisting of Mn8-SLN. Referring to FIG. 3, as the gate wavelength decreases, the saturated spatial electric field decreases in the holographic recording medium comprising Mn8-SLN. In other words, fanning (optical damage) can be reduced if a gating light with shorter wavelength is used. According to the present invention, the gating light with the wavelength of 410 nm or shorter is used. The saturated spatial electric field at the wavelength equal to or shorter than 410 nm does not reach the threshold electric field from which fanning occurs ($10^5$ V/cm). Therefore if gating light at the wavelength equal to or shorter than 410 nm is adopted in the holographic recording medium consisting of Mn-SLN according to the invention, fanning (optical damage) can be suppressed.

Although FIG. 3 shows the relationship of 8 wt ppm Mn-doping, the similar result is obtained provided the Mn content is in the range from 1 wt ppm to 100 wt ppm.

Further, we investigated the recording sensitivity in the case the holographic recording medium is used.

Figure 4:
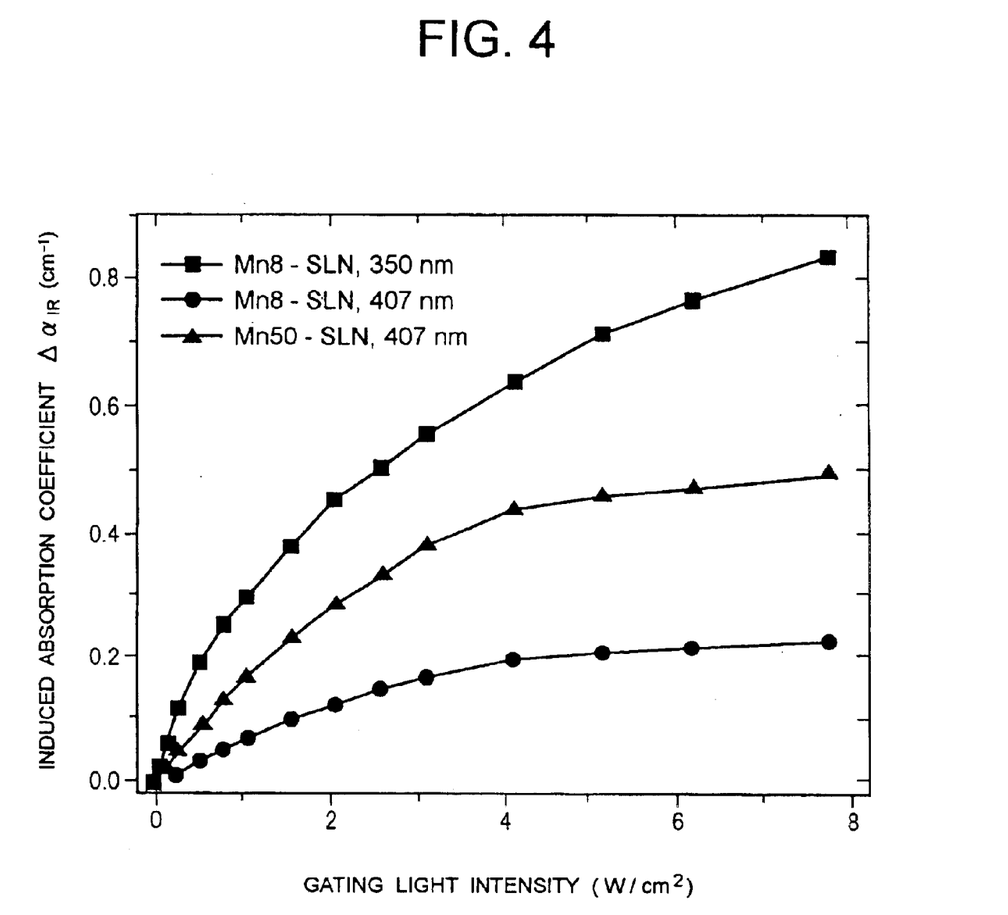
FIG. 4 is a graph showing a gating intensity dependence of optically-induced absorption in the holographic recording medium consisting of Mn-SLN according to the present invention.

FIG. 4 shows the gate intensity dependence of an optically induced absorption coefficient in the holographic recording medium comprising Mn-SLN according to the present invention. The horizontal axis is the gate intensity (in W/cm$^2$) and the vertical axis is an optically induced absorption coefficient $\Delta\alpha_{IR}$ at 852 nm (in cm$^{-1}$). In the figure, the symbol ■ denotes the result obtained from the holographic recording medium consisting of Mn8-SLN, with a gating light at 350 nm. The symbol ● denotes the result obtained from the holographic recording medium consisting of Mn8-SLN, with a gating light at 407 nm. The symbol ▲ denotes the result obtained from the holographic recording medium consisting of MN50-SLN, with a gating light at 407 nm. Referring FIG. 4, the optically induced absorption increases according to the increase in gate intensity.

Also, the optically induced absorption coefficient does not saturate in the intensity range of 0 W/cm$^{2}$–2 W/cm$^2$ at which intensity usual gating is performed. As explained above by using FIG. 2, because the recording sensitivity is proportional to the induced absorption coefficient, further increase in the recording sensitivity is expected by increasing the gate intensity.

As can be seen from FIG. 4, optically induced absorption depends on Mn content and gate wavelength. Therefore this result suggests that optimal setting of Mn content and gate wavelength makes it possible to obtain a required recording sensitivity.

Although FIG. 4 shows the relationship of 8 wt ppm and 50 wt ppm Mn-doping, the similar result is obtained provided the Mn content is in the range from 1 wt ppm to 100 wt ppm.

Figure 5:
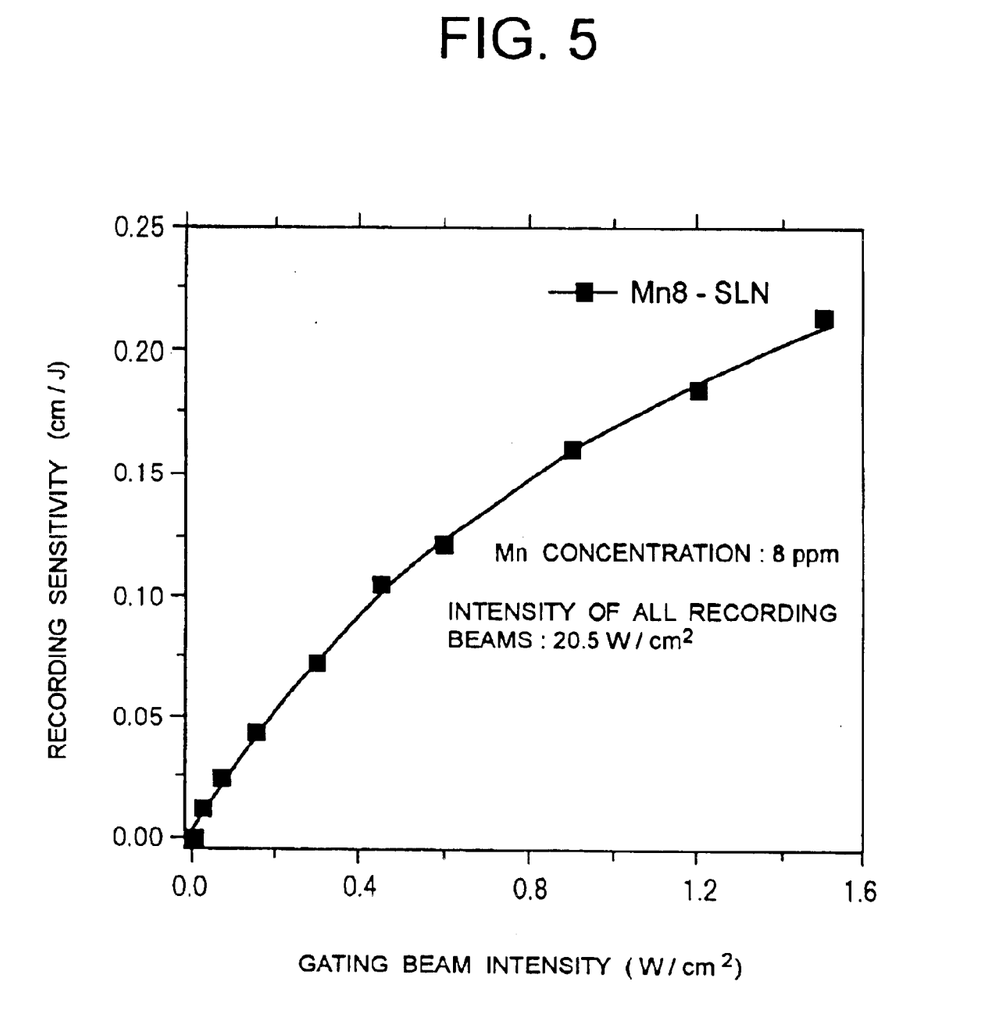
FIG. 5 is a graph showing a gating intensity dependence of recording sensitivity in the holographic recording medium consisting of Mn-SLN according to the present invention.

FIG. 5 shows the gate light intensity dependence of recording sensitivity in the holographic recording medium comprising Mn-SLN according to the present invention. The horizontal axis is the gating light intensity (in W/cm$^2$) and the vertical axis is the recording sensitivity (in cm/J). Among the samples and conditions in FIG. 4, only the result for the Mn8-SLN sample with 350 nm gating is shown in FIG. 5. As stated above by referencing FIG. 4, recording sensitivity increases according to the increase in gate intensity. More precisely, recording sensitivity is 0.2 cm/J at the gate intensity of 1.5 W/cm$^2$. This value is nearly 10 times larger compared to the value of ~0.03 cm/J in conventional reduced Lithium niobate doped with Pr, Mn, or Fe. This high recording sensitivity is enough for the use in holographic recording medium. Therefore the holographic recording medium comprising Mn-SLN according to the present invention possess high recording sensitivity without reduction treatment.

Although FIG. 5 shows the relationship of 8 wt ppm Mn-doping, the similar result is obtained provided the Mn content is in the range from 1 wt ppm to 100 wt ppm.

In the previous description with reference to FIG. 2-FIG. 5, it has been explained that the holographic recording medium comprising Mn-SLN according to the present invention can realize enough sensitivity at the predefined depth of the medium.

In order to record large amount of information on a holographic recording medium, thickness dependence of recording sensitivity have to be considered. From the formula (2), when a gate absorption coefficient $\alpha_g$ is fixed to predetermined value, carrier density $n_B$ in a holographic recording medium decreases exponentially according to the increase in x. In other words, the recording sensitivity decreases according to x along the x-direction if a gate absorption coefficient $\alpha_g$ is fixed to predetermined value. Therefore it is important to optimize the thickness and gate absorption coefficient $\alpha_g$ of the holographic recording medium.

Figure 6:
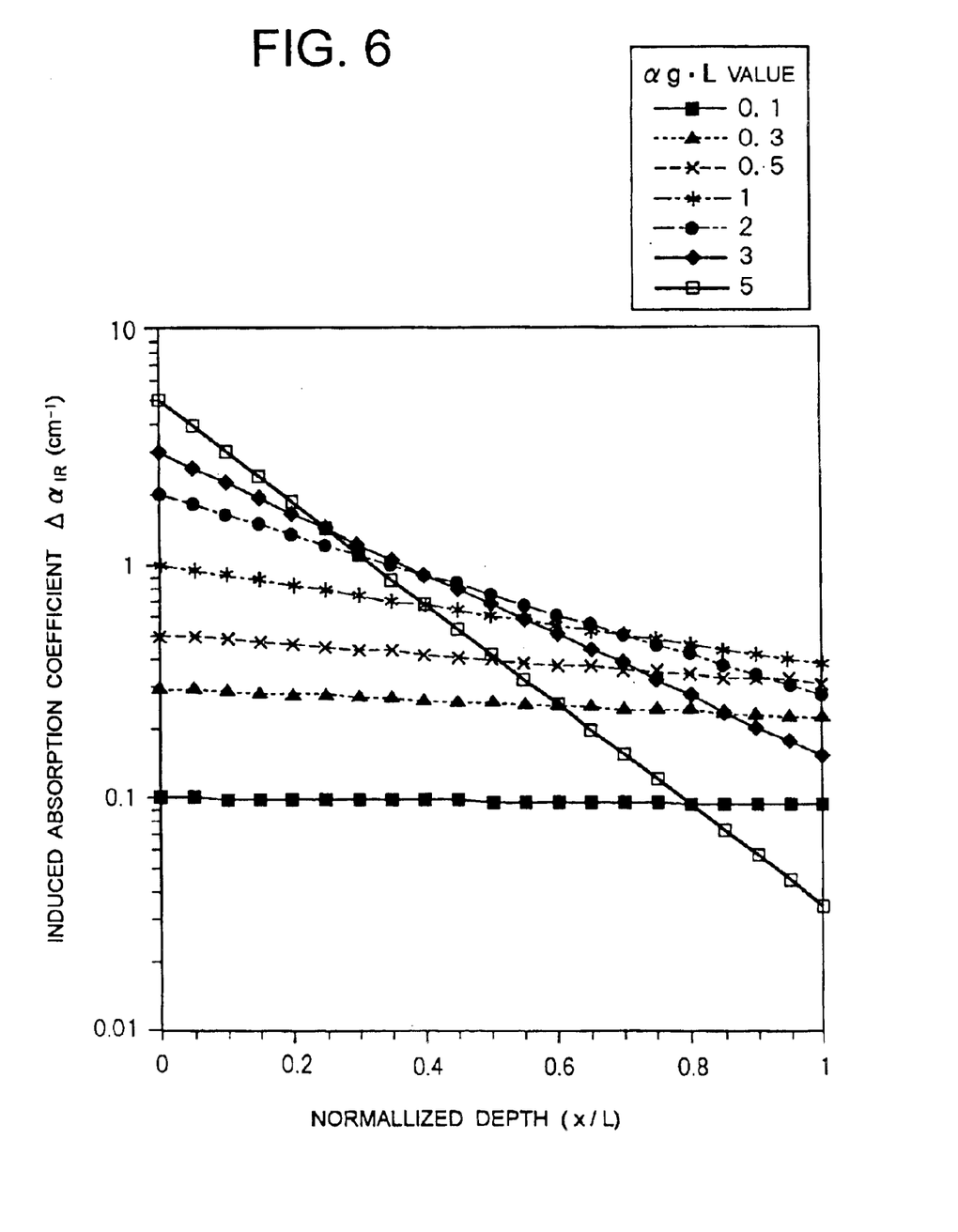
FIG. 6 is a graph of dependence of optically-induced absorption on depth from the surface of the holographic recording medium along the incident direction of gating light.

FIG. 6 shows the dependence of optically induced absorption on depth from the surface along the incident direction of gating light. The horizontal axis is the normalized depth x/L, where x is the depth from the surface along the incident direction of gating light and L is the thickness of holographic recording medium along the incident direction of gating light. The value x/L close to 0 designates the depth which is close to the incident surface of gating light in the holographic recording medium, and the value x/L close to 1 designates the depth which is close to the exit surface of gating light in the holographic recording medium. The vertical axis is an optically induced absorption coefficient ($\Delta\alpha_{IR}$). The graph shows the change of optically induced absorption coefficient ($\Delta\alpha_{IR}$) along the incident direction of gating light, by using the product of gate absorption coefficient ($\alpha_g$) and thickness of holographic recording medium (L) as a parameter.

In the figure, the symbol ■ is correspondent to $\alpha_g \cdot L=0.1$, the symbol ▲ is $\alpha_g \cdot L=0.3$, the symbol X is $\alpha_g \cdot L=0.5$, the symbol * is $\alpha_g \cdot L=1$, the symbol ● is $\alpha_g \cdot L=2$, the symbol ♦ is $\alpha_g \cdot L=3$, the symbol □ is $\alpha_g \cdot L=5$. When the relationship $\alpha_g \cdot L>2$ is satisfied, depth dependence of optically-induced absorption coefficient ($\Delta\alpha_{IR}$) is very large. Namely optically induced absorption coefficient ($\Delta\alpha_{IR}$) at the vicinity of the incident surface is high. however, optically induced absorption coefficient ($\Delta\alpha_{IR}$) at the vicinity of the exit surface is low. This means that induced absorption is produced only in the vicinity of the incident surface; as a result, information cannot be recorded in the region far from the incident surface of gating light. On the other hand, when the relationship $\alpha_g \cdot L<0.5$ is satisfied, depth dependence of optically-induced absorption coefficient ($\Delta\alpha_{IR}$) is very small. However optically induced absorption coefficient ($\Delta\alpha_{IR}$) is too small for the application to holographic recording medium. This means that information cannot be recorded in holographic storage medium under the condition of $\alpha_g \cdot L<0.5$. Therefore, it is preferable for holographic recording medium to fulfill the condition $0.5 \leq \alpha_g \cdot L \leq 2$. More preferably, it is desirable for holographic recording medium to fulfill the condition $\alpha_g \cdot L \sim 1$.

As mentioned above, with reference to FIG. 2-FIG. 6, the availability of the holographic recording medium comprising Mn-SLN according to the present invention has been explained by using several optical properties. In the previous embodiment, lithium niobate doped with Mn is explained as a holographic recording material. However, the present invention is not limited to Mn-SLN. According to another embodiment of the invention, substantially stoichiometric lithium tantalate doped with Mn is also adopted as a holographic recording material. The substantially stoichiometric lithium tantalate single crystal doped with Mn can be grown by using top-seeded solution growth method as well, and Mn content is in the range from 1 wt ppm to 100 wt ppm.

Also in the case that lithium tantalate is adopted, the term "substantially stoichiometric composition" is defined like this: although molar fraction of $[Li_2O]/([Li_2O]+[Ta_2O_5])$ is not 0.50. composition is very close to the stoichiometric composition compared to the congruent composition. namely molar fraction of $[Li_2O]/([Li_2O]+[Ta_2O_5])$ is in the range from 0.495 to 0.50.

It is to be understood that the substantially stoichiometric Lithium tantalate single crystal doped with Mn provides the similar results as Mn-SLN without reduction treatment.

Figure 7:
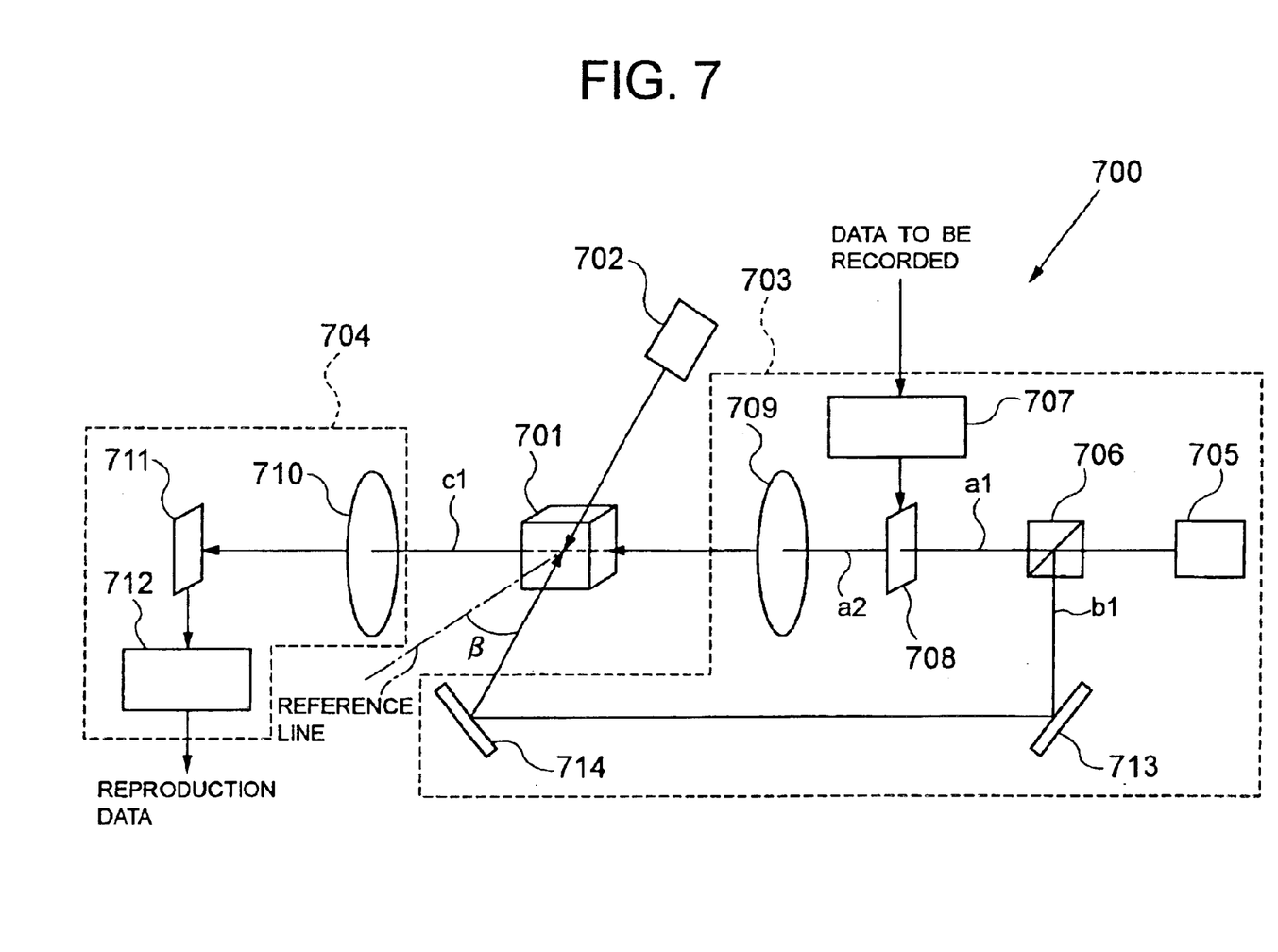
FIG. 7 is a schematic diagram of the holographic recording/reproducing apparatus according to the invention.

FIG. 7 shows a schematic diagram of a holographic recording/reproducing apparatus 700 according to the present invention. The holographic recording/reproducing apparatus 700 records information on the holographic recording medium 701 according to the present invention that is explained in above-mentioned embodiments, and reproduces information from the holographic recording medium 701.

The holographic recording/reproducing apparatus 700 includes a first light source section (first irradiation means for irradiation) 702 and a second light source section (second irradiation means for irradiation)703 and reproducing section 704.

As the first light source section 702, for example, it is possible to use a solid state laser using a GaN semiconductor laser or a third harmonic generation (THG) from a YAG laser, however the first light source section is not limited to them. The first light source section 702 emits the first light (gating light). Wavelength of the first light is 350 nm, for example. Irradiation of the holographic recording medium with the first light source section 702 creates carriers responsible for photorefractive effect in the holographic recording medium 701. Because it is possible to use a gating light at a wavelength of 410 nm or shorter for the holographic recording medium 701 according to the present invention, miniaturization of the first light source 702, and moreover, miniaturization of the holographic recording/reproducing apparatus 700 can be realized.

The second light source section 703 includes a signal/reference light source 705, a beam splitter 706, encoder 707, spatial light modulator (SLM) 708, and a first lens 709.

As the signal/reference light source 705, a AlGaAs semiconductor laser with single longitudinal mode can be used but not restricted to that. The signal/reference light source 705 emits the second light at a wavelength longer than that of the first light. The second light, for example, is a coherent light at a wavelength of 850 nm.

The beam splitter 706 splits the second light into a signal light a1 and a reference light b1. It must be noticed that at this point the signal light a1 does not carry information. The reference light b1 enter the holographic recording medium 701 via a mirror 713 and 714 etc. An arbitrary optical system may be used to direct the reference light b1 to the holographic recording medium 701. The reference light b1 is incident to the holographic recording medium 701 at an angle β to a reference line which is perpendicular to an optical axis of the signal light a2.

The encoder 707 converts digital data to be recorded on a holographic recording medium 701 of single-crystal lithium niobate containing Mn, to a light-and-dark dot pattern image on a plane, and arranges the data into a data array e.g. of 640 bits wide by 480 bits high to generate a unit page data sequence. This data sequence is sent to an SLM 708, implemented e.g. by a panel of a transmission TFT (Thin Film Transistor) liquid crystal display (LCD).

The SLM 708 has modulating units of 640 pixels wide by 480 pixels high which correspond to a unit page. The SLM 708 modulates a coherent signal light a1, applied thereto, to a spatial optical ON/OFF signal in response to the unit page data sequence supplied from the encoder 707, and guides the modulated signal light a2 to a first lens 709.

More specifically, the SLM 708 allows the signal light a1 to pass therethrough in response to a logical value "1" of bits of the unit page data sequence in the form of an electric signal, and blocks the signal light a1 in response to a logical value "0" of bits of the unit page data sequence, whereby electro-optical conversion is achieved in response to each bit of unit page data to generate a modulated signal light a2, i.e. a signal light indicative of the unit page data sequence.

The signal light a2 enters the holographic recording medium 701 via the first lens 709.

In this way, the second light source section 703 irradiates the second light to the holographic recording medium 701.

The reproducing section 704 includes a second lens 710, photodetector 711, and decoder 712.

The second lens 710 focuses a reproduced light c1 from the holographic recording medium 701 on photodetector 711.

The photodetector 711 is implemented e.g. by Charge Coupled Device (CCD). The photodetector 711 converts the light and shade of the reproducing light c1 to electric signal pulses and supplies an analog electric signal having a level dependent on the luminance of the reproduced light c1 to a decoder 712.

The decoder 712 compares the analog electric signal with a predetermined amplitude value (slice level) and reproduces corresponding data represented by logical values "1" and "0". The recording section 704 can be omitted when only the recording is performed.

Figure 8:
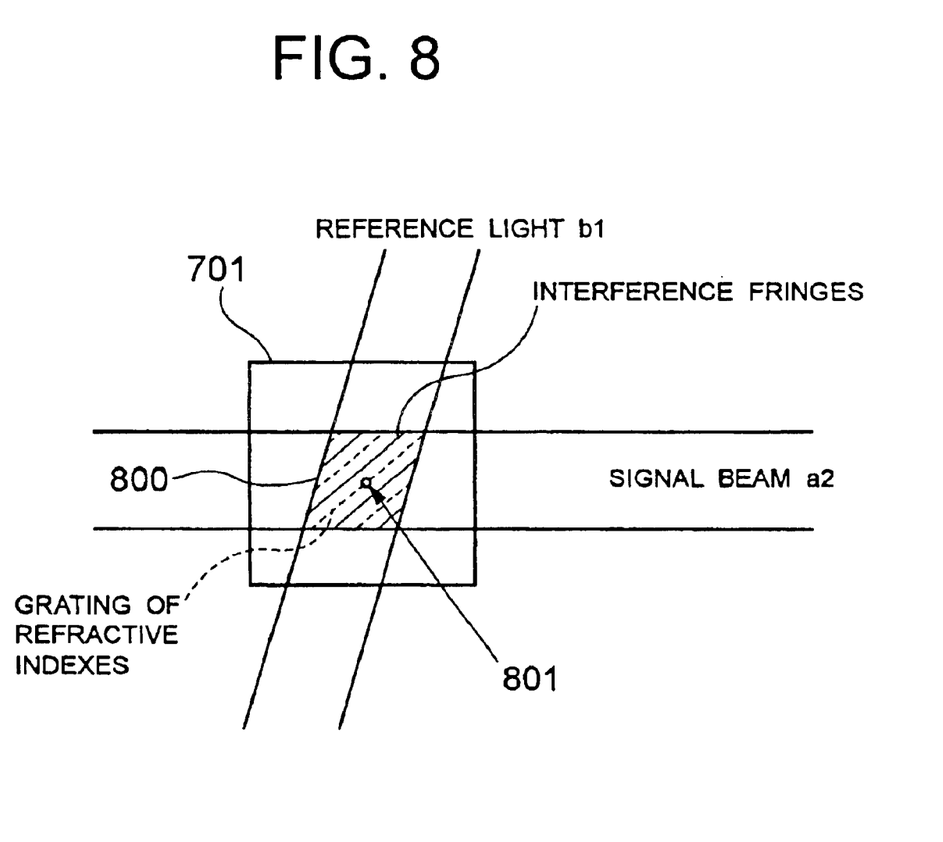
FIG. 8 is a schematic diagram showing the formation of index grating in the holographic recording medium.

Referring to FIG. 8, the signal light a2 and the reference light b1 interfere with each other within the holographic recording medium 701. The interference fringes generates in an intersection area 800 (a slanted line part of FIG. 8) of the signal light a2 and the reference light b1. Resultant interference fringes are stored as a grating of refractive indexes, whereby data recording is performed.

Further, it is possible to apply the reference light b1 to the holographic recording medium 701 at different incidence angles β for angle-multiplexed recording of a plurality of two-dimensional plane data items, whereby three-dimensional data recording can be achieved.

FIG. 7 is referred to again, and reproducing mode of a holographic recording/reproducing apparatus 700 is explained. The signal/reference light source 705 emits a second light. The wavelength of the second light is, for example, 850 nm. The second light passes through the beam splitter 706. Only the reference light b1 is applied to the holographic recording medium 701 at the same incidence angle β as was set for recording the data, in a manner directed toward the center 801 of an area 800 (FIG. 8) in which the signal light a2 and the reference light b1 intersect with each other in recording the data. That is, differently from the case of recording, the signal light is not applied to the holographic recording medium 701.

The reference light b1 is diffracted by the interference fringes (a slanted line part of FIG. 8). The diffracted light from the interference fringes is a reproduced light c1. The reproduced light c1 is guided to photodetector 711 through the second lens 710. The photodetector 711 converts the light and shade of the reproduced light c1 to electric signal pulses and supplies an analog electric signal having a level dependent on the luminance of the reproduced light c1 to the decoder 712. The decoder 712 compares the analog signal with a predetermined amplitude value (slice level) and reproduces corresponding data represented by logical values "1" and "0", whereby information recorded on the holographic recording medium 701 is reproduced.

The holographic recording medium comprises a crystal body including lithium niobate single crystal or lithium tantalate single crystal which has substantially stoichiometric composition and includes Mn as an impurity in the range from 1 wt ppm to 100 wt ppm. The energy band of the crystal body includes a first energy level, a second energy level, a third energy level, wherein the first energy level exists at the deeper energy position than the second energy level and the third energy level exists at the deeper energy position than the second energy level when measured from the bottom of the conduction band. Carriers are excited from the first energy level to the second energy level by the irradiation lithium niobate single crystal or lithium tantalate single crystal with a first light at a wavelength of 410 nm or shorter.

The lithium niobate single crystal on lithium tantalate single crystal mentioned above has the first energy level in as-grown condition. This means that enough carriers exist at the first energy state without reduction treatment. Therefore by using the holographic recording medium according to the present invention high recording sensitivity can be obtained without reduction treatment.

Because the wavelength of the first light that produces carriers responsible for photorefractive effect is equal to or shorter than 410 nm, optical damage is suppressed compared to the conventional holographic recording medium.

Because the gating light at a wavelength of 410 nm or shorter, miniaturization of the gating light source is possible, moreover the miniaturization of the optical system of the recording/reproducing system is possible.

This application is based on a Japanese patent applications No.2002-263809 and No.2003-312287 which are hereby incorporated by reference.

What is claimed is:

1. A two-color holographic recording medium comprising:
    a crystal body including a lithium niobate single crystal or a lithium tantalate single crystal which has substantially stoichiometric composition and is doped with only Mn in the range from 1 wt ppm to 100 wt ppm.

2. The two-color holographic recording medium according to claim 1,
    said crystal body includes a first energy level, a second energy level, and a third energy level,
    wherein said first energy level exists at a deeper energy position than said second energy level measured from the bottom of a conduction band,
    wherein said third energy level exists at a deeper energy position than said second energy level measured from the bottom of the conduction band,
    wherein carriers are excited from said first energy level to said second energy level by the irradiation of a gating light at a wavelength of 410 nm or shorter,
    wherein said carriers excited to said second energy level are trapped to said third energy level by the irradiation of a signal light and a reference light at a wavelength longer than said gating light.

3. The two-color holographic recording medium according to claim 1,
    wherein a product $\alpha_g \cdot L$ of an optical absorption coefficient ($\alpha_g$) of said lithium niobate single crystal or lithium tantalate single crystal with respect to a gating light having a wavelength of 410 nm or shorter and a length (L) of said single crystal along said gating light incident direction is within a range of 0.5 to 2.0.

4. A holographic recording/reproducing apparatus for recording information in a two-color holographic recording medium and for reproducing information from said two-color holographic recording medium comprising:
    a first irradiation means for irradiating said two-color holographic recording medium with a gating light having a wavelength of 410 nm or shorter; and
    a second irradiation means for irradiating said two-color holographic recording medium with a signal light containing information to be recorded and a reference light,
    wherein said gating light has a shorter wavelength than those of said signal light and said reference light, wherein said two-color holographic recording medium comprises a crystal body including a lithium niobate single crystal or a lithium tantalate single crystal which has substantially stoichiometric composition and is doped with only Mn in the range from 1 wt ppm to 100 wt ppm.

5. A method for recording information on a two-color holographic recording medium comprising:

providing the two-color holographic recording medium comprises a crystal body including a lithium niobate single crystal or a lithium tantalate single crystal which has substantially stoichiometric composition and is doped with only Mn in the range from 1 wt ppm to 100 wt ppm;

irradiating the crystal body with a gating light having a wavelength of 410 nm or less;

irradiating the crystal body with a recording light with a wavelength greater than 410 nm during the irradiation of the gating light.

6. The method according to claim 5, wherein said crystal body includes a first energy level, a second energy level, and a third energy level, wherein said first energy level exists at a deeper energy position than said second energy level measured from the bottom of a conduction band, wherein said third energy level exists at a deeper energy position than said second energy level measured from the bottom of the conduction band, wherein carriers are existed from said first energy level to said second energy level by the irradiation of the gating light, wherein said carriers existed to said second energy level are trapped to said third energy level by the irradiation of the recording light.

7. The method according to claim 5, wherein the recording light comprises a reference light and a signal light, both with the same wavelength.

8. The method according to claim 5, wherein a product $\alpha_g \cdot L$ of an optical absorption coefficient ($\alpha_g$) of said lithium niobate single crystal or lithium tantalate single crystal with respect to said gating light and a length (L) of said single crystal along said gating light incident direction is within a range of 0.5 to 2.0.

* * * * *